United States Patent
Liu et al.

(10) Patent No.: US 10,373,361 B2
(45) Date of Patent: Aug. 6, 2019

(54) PICTURE PROCESSING METHOD AND APPARATUS

(71) Applicant: Huawei Technologies Co., Ltd., Shenzhen, Guangdong (CN)

(72) Inventors: Jie Liu, Xi'an (CN); Zhijie Liu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/541,315

(22) PCT Filed: Dec. 23, 2015

(86) PCT No.: PCT/CN2015/098446
§ 371 (c)(1),
(2) Date: Jun. 30, 2017

(87) PCT Pub. No.: WO2016/107477
PCT Pub. Date: Jul. 7, 2016

(65) Prior Publication Data
US 2017/0352175 A1 Dec. 7, 2017

(30) Foreign Application Priority Data
Dec. 31, 2014 (CN) .......................... 2014 1 0856838

(51) Int. Cl.
*G06T 3/40* (2006.01)
*G06T 11/60* (2006.01)
*H04N 5/232* (2006.01)

(52) U.S. Cl.
CPC ................ *G06T 11/60* (2013.01); *G06T 3/40* (2013.01); *G06T 3/403* (2013.01); *H04N 5/232* (2013.01); *H04N 5/23229* (2013.01)

(58) Field of Classification Search
None
See application file for complete search history.

(56) References Cited

U.S. PATENT DOCUMENTS 6,222,551 B1 * 4/2001 Schneider ............... G06T 15/20
345/419
9,197,874 B1 * 11/2015 Pan ....................... H04N 13/243
(Continued)

FOREIGN PATENT DOCUMENTS

| CN | 1412047 A | 4/2003 |
| CN | 1506742 A | 6/2004 |

(Continued)

OTHER PUBLICATIONS

Butler, "Match your focal lengths when compositing two images in Photoshop", Brodie Butler Photography, May 12, 2012, 4 pages. http://www.brodiebutler.com/match-your-focal-lengths-when-compositing-two-images-in-photoshop/.
(Continued)

*Primary Examiner* — David H Chu (57) ABSTRACT

Embodiments of the present invention provide a picture processing method and apparatus. The method includes: obtaining, from a first device, a figure image of a first subject and a first focal length corresponding to the figure image; obtaining a figure image that is of a second subject and determined according to the first focal length; and compositing the figure image of the second subject, the figure image of the first subject, and a selected background image. By using the embodiments of the present invention, users in different places can easily and conveniently take a group photo.

15 Claims, 1 Drawing Sheet

(56) References Cited

U.S. PATENT DOCUMENTS

| | | | |
|---|---|---|---|
| 2003/0085999 A1 | 5/2003 | Okamoto et al. | |
| 2004/0119852 A1 | 6/2004 | Shin | |
| 2005/0128323 A1* | 6/2005 | Choi | G03B 29/00 348/239 |
| 2007/0146798 A1* | 6/2007 | Eto | H04N 1/00132 358/302 |
| 2009/0257730 A1 | 10/2009 | Chen et al. | |
| 2012/0182393 A1* | 7/2012 | Yagi | H04N 13/156 348/46 |
| 2013/0162672 A1* | 6/2013 | Sen | G09G 5/377 345/632 |
| 2014/0009422 A1* | 1/2014 | Arigaya | G09G 5/006 345/173 |
| 2014/0169697 A1* | 6/2014 | Breckenridge | G06T 11/60 382/284 |
| 2015/0286899 A1* | 10/2015 | Nakayama | G06T 3/0093 382/224 |
| 2016/0148343 A1* | 5/2016 | Yan | G06T 7/11 345/660 |

FOREIGN PATENT DOCUMENTS

| | | |
|---|---|---|
| CN | 101431613 A | 5/2009 |
| CN | 101521754 A | 9/2009 |
| CN | 101562682 A | 10/2009 |
| CN | 101571660 A | 11/2009 |
| CN | 101651767 A | 2/2010 |
| CN | 102088550 A | 6/2011 |
| CN | 102542545 A | 7/2012 |
| CN | 102821253 A | 12/2012 |
| CN | 104125412 A | 10/2014 |
| JP | 2001358927 A | 12/2001 |
| JP | 2012165212 A | 8/2012 |
| KR | 100619975 B1 | 9/2006 |
| RU | 77056 U1 | 10/2008 |
| WO | 2013163904 A1 | 11/2013 |

OTHER PUBLICATIONS

"Exif," Wikipedia, Jun. 11, 2013, 10 pages, XP055494088.
"Acknowledgement (data networks)," Wikipedia, Oct. 11, 2010, 1 pages, XP055404867.

* cited by examiner

PICTURE PROCESSING METHOD AND APPARATUS

CROSS-REFERENCE TO RELATED APPLICATIONS

This application is a national stage of International Application No. PCT/CN2015/098446, filed on Dec. 23, 2015, which claims priority to Chinese Patent Application No. 201410856838.0, filed on Dec. 31, 2014, all of the aforementioned applications are hereby incorporated by reference in their entireties.

TECHNICAL FIELD

The present invention relates to the field of communications technologies, and in particular, to a picture processing method and apparatus.

BACKGROUND

Family or friends who live in different places need to get together if they want to take a group photo. Even for several good friends who live in a same city, it may be difficult to get together on a particular day every year to take a group photo to record everyone's growth and status. Currently, the only way to implement group photo combination is processing and merging pictures by using specialized picture processing software. However, this raises a requirement for a processing person on a software using skill, which is infeasible and inconvenient for general consumers. In addition, a picture obtained by merging by using software easily leaves an editing mark and therefore is not realistic enough.

SUMMARY

To resolve an existing problem of inconvenience in taking a group photo of many persons in different places, the present invention provides the following technical solutions:

According to a first aspect, an embodiment of the present invention provides a picture processing method, where the method includes:

obtaining first media information of a first device, where the first media information includes: a figure image of a first subject and a first focal length corresponding to the figure image;

obtaining a figure image that is of a second subject and determined according to the first focal length; and compositing the figure image of the second subject, the figure image of the first subject, and a selected background image.

In a first possible implementation manner of the first aspect, the method includes: obtaining, by a second device, the first media information of the first device, where the first media information includes: the figure image of the first subject or the figure image of the first subject and a figure image of another subject, and the first focal length corresponding to the figure image of the first subject;

determining, by the second device, the figure image of the second subject according to the obtained first focal length;

compositing, by the second device, the figure image of the second subject, the obtained figure image, and the selected background image;

storing composited content and the first focal length to a preset location, where a second focal length may also be stored to the preset location at the same time; and sending, to the first device, a completion message for notifying that a group photo has been completed.

In a second possible implementation manner of the first aspect, the method includes: obtaining, by a second device, the first media information of the first device, where the first media information includes: the figure image of the first subject or the figure image of the first subject and a figure image of another subject, and the first focal length corresponding to the figure image of the first subject, where a second focal length corresponding to the background image may also be obtained at the same time;

determining, by the second device, the figure image of the second subject according to the obtained first focal length;

compositing, by the second device, the figure image of the second subject, the obtained figure image, and the selected background image;

sending, by the second device, composited content and the first focal length to a third device, where the second focal length may also be sent to the third device at the same time; and receiving a completion message for notifying that a group photo has been completed.

In a third possible implementation manner of the first aspect, the method includes: obtaining, by a fourth device, the first media information of the first device, where the first media information includes: the figure image of the first subject or the figure image of the first subject and a figure image of another subject, and the first focal length corresponding to the figure image of the first subject, where a second focal length corresponding to the background image may also be obtained at the same time;

obtaining, by the fourth device, the figure image that is of the second subject and determined according to the first focal length;

compositing, by the fourth device, the figure image of the second subject, the obtained figure image, and the selected background image;

storing composited content and the first focal length to a preset location, where the second focal length may also be stored to the preset location at the same time; and sending, to the first device and a second device, a completion message for notifying that a group photo has been completed.

With reference to the first or the second possible implementation manner of the first aspect, in a fourth possible implementation manner of the first aspect, the obtaining, by a second device, the first media information of the first device specifically includes:

obtaining, by the second device, the first media information of the first device, where the first media information includes: the figure image of the first subject or the figure image of the first subject and the figure image of the another subject, the first focal length corresponding to the figure image of the first subject, and the background image of the first subject, where the second focal length corresponding to the background image may also be obtained at the same time; and the compositing, by the second device, the figure image of the second subject, the obtained figure image, and the selected background image specifically includes:

compositing, by the second device, the figure image of the second subject, the obtained figure image, and the background image of the first subject.

With reference to the third possible implementation manner of the first aspect, in a fifth possible implementation manner of the first aspect, the obtaining, by the fourth device, the figure image that is of the second subject and determined according to the first focal length specifically includes:

obtaining, by the second device and from the first device or at the preset location, the first focal length corresponding to the figure image of the first subject; determining, by the second device, the figure image of the second subject according to the obtained first focal length; and obtaining, by the fourth device, the determined figure image of the second subject from the second device; or obtaining, by the second device and from the first device or at the preset location, the first focal length corresponding to the figure image of the first subject; determining, by the second device according to the obtained first focal length, the figure image of the second subject, and storing the figure image of the second subject to the preset location; and obtaining, by the fourth device, the figure image of the second subject at the preset location.

With reference to the third or the fifth possible implementation manner of the first aspect, in a sixth possible implementation manner of the first aspect, the obtaining, by a fourth device, the first media information of the first device specifically includes:

obtaining, by the fourth device, the first media information of the first device from the first device or at the preset location, where the first media information includes: the figure image of the first subject or the figure image of the first subject and the figure image of the another subject, the first focal length corresponding to the figure image of the first subject, the background image of the first subject, and the second focal length corresponding to the background image; and the compositing, by the fourth device, the figure image of the second subject, the obtained figure image, and the selected background image specifically includes:

compositing, by the fourth device, the figure image of the second subject, the obtained figure image, and the background image of the first subject.

With reference to the first possible implementation manner of the first aspect, in a seventh possible implementation manner of the first aspect, the determining, by the second device, the figure image of the second subject according to the obtained first focal length specifically includes:

determining, by the second device, the figure image of the second subject according to the obtained first focal length, and determining a background image of the second subject according to the obtained second focal length; and storing the composited content, the first focal length, and the second focal length to the preset location specifically includes:

storing the composited content, the first focal length, and the background image of the second subject to the preset location, where the second focal length may also be stored at the same time.

With reference to the second possible implementation manner of the first aspect, in an eighth possible implementation manner of the first aspect, the determining, by the second device, the figure image of the second subject according to the obtained first focal length specifically includes:

determining, by the second device, the figure image of the second subject according to the obtained first focal length, and determining a background image of the second subject according to the obtained second focal length; and the sending, by the second device, composited content and the first focal length to a third device specifically includes:

sending, by the second device, the composited content, the first focal length, and the background image of the second subject to the third device, where the second focal length may also be sent to the third device at the same time.

With reference to any one of the first to third possible implementation manners of the first aspect, in a ninth possible implementation manner of the first aspect, the completion message for notifying that a group photo has been completed is specifically a completion message that includes information for notifying that a group photo has been completed and information about the preset location.

With reference to the first or the second possible implementation manner of the first aspect, in a tenth possible implementation manner of the first aspect, the obtaining, by a second device, the first media information of the first device is specifically:

receiving, by the second device, the first media information sent by the first device; or obtaining, by the second device, the first media information of the first device at the preset location.

With reference to the seventh possible implementation manner of the first aspect, in an eleventh possible implementation manner of the first aspect, the first device and/or the second device access/accesses the preset location, and replace/replaces a background image of the composited content with the background image of the second subject.

With reference to the eighth possible implementation manner of the first aspect, in a twelfth possible implementation manner of the first aspect, the third device replaces a background image of the composited content with the background image of the second subject.

With reference to any one of the first to the eighth possible implementation manners of the first aspect, in a thirteenth possible implementation manner of the first aspect, the obtaining first media information of a first device includes:

taking a photo, and recording a focal length corresponding to each figure in the photo and a focal length corresponding to a background in the photo; and performing figure-background separation on the taken photo to obtain the figure image of the first subject and the first focal length corresponding to the figure image; or selecting a picture, and performing figure-background separation on the selected picture to obtain the figure image of the first subject and the first focal length corresponding to the figure image.

According to a second aspect, an embodiment of the present invention provides a picture processing apparatus, where the apparatus includes: a first obtaining unit, a second obtaining unit, and a processing unit, where the first obtaining unit is configured to obtain first media information of a first device, where the first media information includes: a figure image of a first subject and a first focal length corresponding to the figure image;

the second obtaining unit is configured to obtain a figure image that is of a second subject and determined according to the first focal length; and the processing unit is configured to composite the figure image of the second subject, the figure image of the first subject, and a selected background image.

In a first possible implementation manner of the second aspect, the first obtaining unit is configured to obtain the first media information of the first device, where the first media information includes: the figure image of the first subject or the figure image of the first subject and a figure image of another subject, and the first focal length corresponding to the figure image of the first subject;

the second obtaining unit is configured to determine the figure image of the second subject according to the obtained first focal length; and the processing unit is configured to: composite the figure image of the second subject, the obtained figure image, and the selected background image; store composited content and the first focal length to a preset location; and instruct a sending unit to send, to the first device, a completion message for notifying that a group photo has been completed, where a second focal length may also be stored at the same time; and the sending unit is configured to send, to the first device according to an instruction of the processing unit, the completion message for notifying that a group photo has been completed.

In a second possible implementation manner of the second aspect, the first obtaining unit is configured to obtain the first media information of the first device, where the first media information includes: the figure image of the first subject or the figure image of the first subject and a figure image of another subject, and the first focal length corresponding to the figure image of the first subject, where a second focal length corresponding to the background image may also be stored at the same time;

the second obtaining unit is configured to determine the figure image of the second subject according to the obtained first focal length;

the processing unit is configured to: composite the figure image of the second subject, the obtained figure image, and the selected background image; and instruct a sending unit to send composited content and the first local length to a third device, where the second focal length may also be sent to the third device at the same time, where the sending unit is configured to send the composited content and the first focal length to the third device according to an instruction of the processing unit, where the second focal length may be sent to the third device at the same time; and a receiving unit is configured to receive a completion message for notifying that a group photo has been completed.

In a third possible implementation manner of the second aspect, the first obtaining unit is configured to obtain the first media information of the first device, where the first media information includes: the figure image of the first subject or the figure image of the first subject and a figure image of another subject, and the first focal length corresponding to the figure image of the first subject, where a second focal length corresponding to the background image may be obtained at the same time;

the second obtaining unit is configured to obtain the figure image that is of the second subject and determined according to the first focal length; and the processing unit is configured to: composite the figure image of the second subject, the obtained figure image, and the selected background image; store composited content and the first focal length to a preset location, where the second focal length may also be stored into the location; and instruct a sending unit to send, to the first device and a second device, a completion message for notifying that a group photo has been completed, where the sending unit is configured to send, to the first device and the second device according to an instruction of the processing unit, the completion message for notifying that a group photo has been completed.

With reference to the first or the second possible implementation manner of the second aspect, in a fourth possible implementation manner of the second aspect, the first obtaining unit is configured to obtain the first media information of the first device, where the first media information includes: the figure image of the first subject or the figure image of the first subject and the figure image of the another subject, the first focal length corresponding to the figure image of the first subject, and the background image of the first subject, where the second focal length corresponding to the background image may also be obtained; and the processing unit is configured to composite the figure image of the second subject, the obtained figure image, and the background image of the first subject.

With reference to the third possible implementation manner of the second aspect, in a fifth possible implementation manner of the second aspect, the second obtaining unit is configured to obtain the determined figure image of the second subject from the second device, where the figure image of the second subject is determined by the second device according to the first focal length that is corresponding to the figure image of the first subject and obtained by the second device from the first device or at the preset location; or is configured to obtain the figure image of the second subject at the preset location, where the figure image of the second subject is obtained by the second device according to the first focal length that is corresponding to the figure image of the first subject and obtained by the second device from the first device or at the preset location, and the figure image of the second subject is stored to the preset location.

With the reference to the third or the fifth possible implementation manner of the second aspect, in a sixth possible implementation manner of the second aspect, the first obtaining unit is configured to obtain the first media information of the first device from the first device or at the preset location, where the first media information includes: the figure image of the first subject or the figure image of the first subject and the figure image of the another subject, the first focal length corresponding to the figure image of the first subject, and the background image of the first subject, where the second focal length corresponding to the background image may also be obtained; and the processing unit is configured to composite the figure image of the second subject, the obtained figure image, and the background image of the first subject.

With reference to the first to the third possible implementation manners of the second aspect, in a seventh possible implementation manner of the second aspect, the apparatus may be a mobile phone, a mobile computer, a portable computer, a tablet, or another mobile terminal; or another electronic device that has a photo taking and communication function.

It can be known from the foregoing technical solutions, that in the embodiments of the present invention, a user can automatically determine, according to an obtained figure image and background image, a focal length value of a photo taken by the user or a picture, and can easily and conveniently take a group photo in different places.

BRIEF DESCRIPTION OF THE DRAWINGS

To describe the technical solutions in the embodiments of the present invention more clearly, the following briefly describes the accompanying drawing required for describing the embodiments. Apparently, the accompanying drawing in the following description shows only some embodiments of the present invention, and persons skilled in the art may still derive other drawings from the accompanying drawing without creative efforts.

FIG. 1 is a schematic flowchart of a first embodiment of a picture processing method according to an embodiment of the present invention.

DETAILED DESCRIPTION

To make the objectives, the technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In the prior art, if wanting to take a group photo, they gather together on the scene for photographing, or provide respective photos and process and merge them by using graphics processing software such as Photoshop. The former requires all group photo participants to appear on the scene at the same time. The latter requires a processing person to have a using software skill, and the photo has an unsatisfactory merging effect and is not realistic enough when figure sizes and focal lengths have a big difference.

The embodiments of the present invention provide a picture processing method and apparatus, so as to provide a simple and convenient solution of automatic group photo merging, which allows a group photo of many persons in different places to be taken, is easy to operate and fits in with a daily operation habit.

The following clearly and completely describes the technical solutions in the embodiments of the present invention with reference to the accompanying drawings in the embodiments of the present invention. Apparently, the described embodiments are only some but not all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and so on are intended to distinguish between similar objects but do not necessarily indicate a specified order or an order of priority. It should be understood that the data termed in such a way are interchangeable in proper circumstances so that the embodiments of the present invention described herein can be implemented in other orders than the order illustrated or described herein. Moreover, the terms "include", "contain" and any other variants intend to cover the non-exclusive inclusion, for example, a process, method, system, product, or device that includes a list of steps or units is not necessarily limited to expressly listing those steps or units, but may include other steps or units not expressly listed or inherent to such a process, method, system, product, or device.

Figure 1:
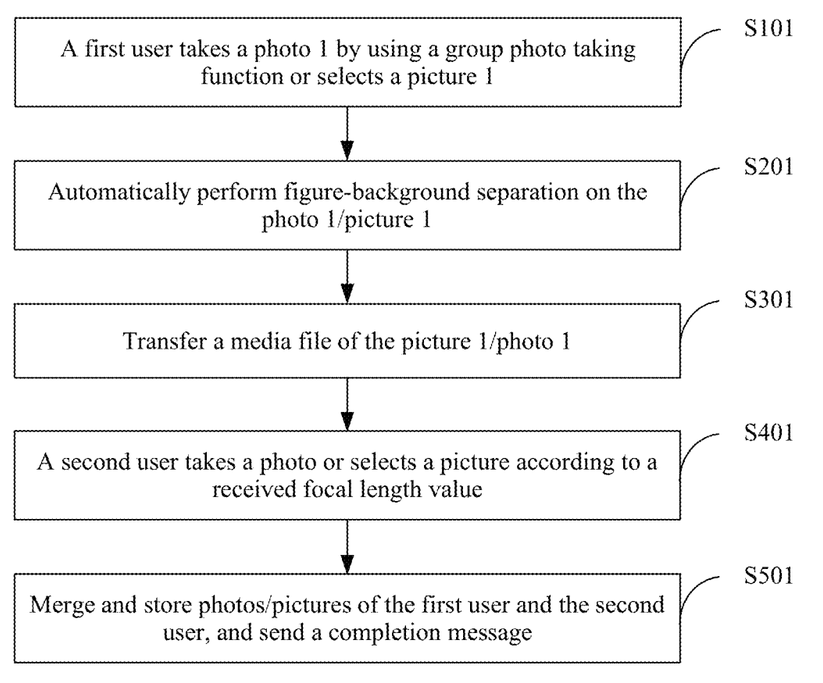

Referring to FIG. 1, an embodiment of the present invention provides a first embodiment of a picture processing method. This embodiment specifically includes:

This embodiment may be applied to an electronic device that has a photo taking function, and operation steps are as follows:

1> (S101) A first user selects a photo taking function—a group photo taking sub-function of the photo taking function—taking a photo (that is, taking a new photo 1) on the first user's electronic device that has a photo taking function: When taking a photo of a figure A and a background A, a camera records focal length values a1 and a2 of the figure A and the background A in addition to imaging.

Alternatively, a user selects a photo taking function—a group photo taking sub-function of the photo taking function—selecting a picture (that is, selecting a picture 1): The user may select a picture stored in a local device; or access and select a picture stored at a specific location. Accessing the specific location includes but is not limited to: accessing a website, accessing a server, accessing external storage space, and the like. The selected picture 1 includes: a figure A, a background A, and focal length values a1 and a2 of the figure A and the background A.

Alternatively, a user selects a photo taking function—a group photo taking sub-function of the photo taking function, or a user may select a group photo taking function; or a user enters a group photo taking function or sub-function after taking a photo or selecting a picture. For a specific device, another menu setup manner for implementing the function may be alternatively used, which does not affect implementation of an objective of the present invention.

2> (S201) The first user's device automatically performs figure-background separation on the photo/picture 1: The figure A and the background A in the photo 1 are separated according to the different focal length values of the figure and the scene and a facial recognition principle, or obtain, by using another technology, the figure A and the background A that are separated.

Photo processing may be automatically performed by the first user's device; or the device may remind, before automatically performing the photo processing, the user to agree or disagree, and perform the photo processing only with the user's permission.

3> (S301) Transfer a file and information of the picture 1: A media file of the photo 1/picture 1 with the figure and the background separated is transferred to a second user, where transferred content includes the media file of the photo 1 with the figure A and the background A separated, and the focal length values a1 and a2.

Picture file and information may be automatically transferred by the first user's device according to a prestored address/mailbox/phone number or the like; or the device may remind the user to enter a specific address/phone number/mailbox number/QQ number (nickname) or the like, and automatically transfers the picture file and information after determining a to-be-transferred-to subject according to the information entered by the user; or transferring may be performed after automatic authentication based on a received transfer request, or the user is reminded to allow the transferring or not, and the transferring is performed with the user's confirmation.

In addition, content of the media file transferred to the second user may include a media file of the figure A, for example, image data of the figure A and the focal length value a1. The background A and the focal length value a2 may be subsequently transferred to the second user; or the background A and the focal length value a2 may be transferred to another user; or the background A and the focal length value a2 may be not transferred.

In addition, other parameters of the photo 1/picture 1 in step 1>, such as an aperture, a shutter, white balance, and whether to use flash, may be transferred with or separately from the foregoing transferred content, for use by another group photo user. In this way, all figures in a final group photo can be more harmonious, and therefore the group photo is more natural and realistic.

4> (S401) Take a photo 2 of the figure A and a figure B: A shooting parameter of the photo 2 is limited by using the focal length value a1.

After receiving the media file of the photo 1, the second user's electronic device that has a photo taking function enters a group photo taking function (for a specific entering manner, refer to the description in step 1>, and details are not described again): (a) The second user's device directly takes, by using the focal length value a1, a photo of the second user's to-be-photographed subject, that is, the figure B, by using the focal length value a1, and takes a photo of a background B by using the focal length value a2; or (b) The second user's device displays the background A in the received media file as a background in a viewfinder frame, and takes a photo of the figure B by using the focal length value a1; or (c) The second user's device displays the background A and the figure A in the received media file as a background in a viewfinder frame, and takes a photo of the figure B by using the focal length value a1 (when taking the photo, the user can determine a location relationship between the figure B, and the figure A and the background A in the photo), so as to obtain the photo 2; or (d) The second user's device displays the figure A in the received media file as a background in a viewfinder frame, takes a photo of the figure B by using the focal length value a1, and takes a photo of a background B by using the focal length value a2.

The second user's device may provide, according to the obtained focal length value a1, a user with all photos or pictures that meet the focal length value and include a specific subject (for example, the figure B), and the user may select a photo or picture from the photos or pictures. The selected photo or picture includes the figure B and the scene B, which is the same as a result of the case (a), and subsequent processing is also the same as the case (a).

5> Separate the figure B from a scene B, and merge the figure B with the photo 1 to obtain a picture 2.

In the case (a) in step 4> or the case of selecting, the user, a photo or picture by using the focal length value a1, the figure B is separated from the scene B by using a technology the same as or different from that for processing the photo 1: The figure B is merged with the photo 1 that includes the background A and the figure A, so as to obtain a picture 2 that includes the figure A, the figure B, and the background A; or the figure B is merged with the photo 1 that includes the background B and the figure A, so as to obtain a picture 2 that includes the figure A, the figure B, and the background B. Specifically, merging may further include location adjustment. For example, the figure B is placed at a suitable location on the background A or B.

Alternatively, in the case (b) in step 4>, the figure A is merged with a new photo (including the figure B and the background A) taken by the second user, so as to obtain a picture 2 that includes the figure A, the figure B, and the background A. Specifically, merging may further include location adjustment. For example, the figure A is placed at a suitable location of a new photo (including the background A and the figure B) taken by the second user; or the figure B is placed at a suitable location on the photo 1.

Alternatively, in the case (c) in step 4>, step 5> is actually performed in step 4>, and is not performed herein again.

Alternatively, in the case (d) in step 4>, the figure B is separated from the scene B by using a technology the same as or different from that for processing the photo 1: The background A is merged with a new photo (including the figure B and the figure A) taken by the second user, so as to obtain a picture 2 that includes the figure A, the figure B, and the background A; or the background B is merged with a new photo (including the figure B and the figure A) taken by the second user, so as to obtain a picture 2 that includes the figure A, the figure B, and the background B. Specifically, merging may further include location adjustment. For example, the figure B and the figure A are placed at suitable locations on the background A or B.

The picture 2 obtained in step 5> may be automatically processed by the second user's device, or may be sent to another preset device by the second user and processed by the another device; or the picture 2 may be sent to the another device by the second user, and after the another device completes processing, the second device obtains a processing result.

6> Transfer a file and information of the picture 2: A media file of the photo 2/picture 2 with the figure and the background separated is transferred to a third user, where transferred content includes the media file of the photo 2/picture 2 and the focal length value a1.

According to a performing situation in step 5>, the media file of the photo 2/picture 2 may specifically include the figure A, the figure B, and the background A; or the figure A, the figure B, and the background B.

If the media file of the photo 2/picture 2 includes the figure A, the figure B, and the background A, the background B and the focal length value a2 may be transferred to the third user with the media file of the photo 2, or may be separately transferred to the third user, or may be separately transferred to another third-party device or stored to a preset location.

If the media file of the photo 2/picture 2 includes the figure A, the figure B, and the background B, the background A and the focal length value a2 may be transferred to the third user with the media file of the photo 2, or may be separately transferred to the third user, or may be separately transferred to another third-party device or stored to a preset location.

The file and information in step 6> may be automatically processed by the second user's device, or may be processed by the another preset device that performs step 5>.

7> The third user takes, processes, and transfers a group photo by using a method similar to that used by the second user, until the group photo is transferred to an $N^{th}$ user (N is a total quantity of persons in the group photo), where for details, refer to steps 4>, 5>, and 6>. If there are two group photo persons in total, the $N^{th}$ user herein is a second user; if there are three group photo persons in total, the $N^{th}$ user herein is a third user; and so on.

If the second user is the last group photo participant (S701), step 6> is skipped, and after the photo 2/picture 2 is obtained in step 5>, a completion message is sent to the first user, and the obtained photo 2/picture 2 is stored to the preset location. Specifically, the preset location may be storage space that is preset in the second user's device, or may be another external location that includes but is not limited to a website, a server, a web disk, specific external storage space, virtual space, and the like.

The second user may further process the photo 2/picture 2 obtained in step 5>, and stores processed photo 2/picture 2. For example, the second user changes the background of the photo 2/picture 2, for example, a selected photo/picture is used as the background; or beautifies the photo 2/picture 2, for example, a sequence in every direction and sizes of figures in the photo 2/picture 2, a text is added, a watermark such as a time watermark is added, a photo frame is added, music is added, or a video effect is produced.

An operation such as sharing may be performed on the obtained or processed photo 2/picture 2 in step 5> as a common picture.

If a user after the second user, such as a third, a fourth, or an $N^{th}$ user, is the last group photo participant, after step 6>, after obtaining a picture N−1/photo N−1 transferred by a previous user, the $N^{th}$ user separately sends completion messages to the first user to an $(N−1)^{th}$ user; or sends a completion message to a previous user of the $N^{th}$ user, that is, an $(N−1)^{th}$ user, and after receiving the completion message, the $(N−1)^{th}$ user sends the completion message to a previous user of the $(N−1)^{th}$ user, that is, an $(N−2)^{th}$ user, until the first user receives the completion message.

The $N^{th}$ user further stores the obtained photo N−1/picture N−1 to the preset location, or may further process the obtained photo N−1/picture N−1 and store processed photo N−1/picture N−1. Specifically, the storing and processing are the same as the storing and processing of the photo 2/picture 2 by the foregoing second user, and are not described again.

In addition, before the foregoing step 1>, a user may set a reminding operation, to remind, on a particular day or a festival every year or according to a specified time period, any specified user or all specified users, for example, the figure A, to start such a photo taking procedure and transfer the procedure step by step; or to remind any specified user or a specific user to remind other persons or a person to start such a procedure. In this way, a requirement for taking a group photo on a particular day or a festival, or at intervals of a fixed time period every year can be met.

The device may be further set, so as to automatically ask the user for a quantity of persons in a group photo after a photo taking function is selected or a photo is selected, and provides a group photo template according to the quantity of persons (a background/light/a season, and the like), which mainly prompts a standing location, an action, and the like of the user, so as to take a better photo.

By using the method of the present invention, a user only needs to select a group photo taking function, and takes a photo according to a usual photo taking process, without needing an extra software processing skill; and the user can conveniently complete a group photo even when group photo participants are not in a same place. All group photo participants in the group photo have a same focal length value, and therefore the group photo looks quite natural and realistic.

In a second embodiment of the present invention, an example is used to describe a specific scenario of taking a group photo of two persons. The scenario includes:

Xiao Hong (Mery) selects a group photo taking function on her mobile phone, and then takes a photo of her standing in a garden;

Xiao Hong selects a contact, for example, Xiao Hua (Rose), and sends the taken photo to Xiao Hua, according to prompt information on a display of the mobile phone;

after an iPad of Xiao Hua receives the photo, Xiao Hua selects a group photo taking function, and a viewfinder frame of the iPad of Xiao Hua presents the received photo of Xiao Hong, that is, an image of Xiao Hong standing in the garden of Xiao Hong; and then Xiao Hua stands in her room, adjusts her location according to the image in the viewfinder frame, and takes a photo, where the photo is a group photo of Xiao Hong and Xiao Hua who stand in the garden of Xiao Hong;

after Xiao Hua completes photo taking, Xiao Hong receives a completion message sent by Xiao Hua; and after receiving the completion message, Xiao Hong may see the group photo of the two persons by accessing group space on which the two persons previously agree, and may further perform an operation on the group photo, such as editing, sharing, storing, and use the group photo.

By using the solution in this embodiment, Xiao Hong and Xiao Hua only need to preset, on respective mobile phone and iPad device, space into which a group photo is to be stored, and then can take a group photo in different places by using a common photo taking operation, which is easy and convenient to operate and does not require a picture software operation skill.

In a third embodiment of the present invention, an example of a mobile phone is used to describe an implementation process of taking a group photo of two persons in an apparatus. The process includes:

the mobile phone receives first media information from another device, such as another mobile phone, a media pad, or a desktop computer, where the first media information includes: an image of a figure A and a first focal length value used when the image of the figure A is taken; or the first media information may include images of more than one figure and focal length values corresponding to the images, and may further include an image of a background A in which the image of the figure A is taken and a second focal length value used when the image of the background A is taken;

the mobile phone determines an image of a figure B according to the obtained first focal length value, and specifically, the mobile phone may obtain the image of the figure B by taking a photo of the figure B, or may determine the image of the figure B from an existing picture by using the first focal length value;

the mobile phone merges the determined image of the figure B with all obtained figure images; a background may be added after the merging is complete, or a selected background image may be merged with the figure images, where the background image may be the image of the background A, may be an image of a background B, or may be another selected background image; and the mobile phone stores a merged group photo to a preset location, and sends a completion message for notifying that a group photo has been completed to another device, where the completion message may carry or may not carry the location to which the group photo is stored.

By using the solution in this embodiment, an electronic device that has an image processing function can provide a user with a function of taking a group photo in different places, and common users who have no software skill can take a group photo in different places by using a simple photo taking function, which brings great convenience to the user, improves user experience, and enhances a capability of interaction between the electronic device and a user.

A fourth embodiment of the present invention provides an apparatus for implementing all the foregoing method embodiments. The apparatus has a picture processing function and specifically includes:

a first obtaining unit, configured to obtain first media information of a first device, where the first media information includes: a figure image of a first subject and a first focal length corresponding to the figure image;

a second obtaining unit, configured to obtain a figure image that is of a second subject and determined according to the first focal length; and a processing unit, configured to composite the figure image of the second subject, the figure image of the first subject, and a background image selected by a user.

Specifically, when the apparatus is an apparatus of the last group photo participant, and the group photo is a group photo of two persons, the first media information may include: the figure image of the first subject or the figure image of the first subject and a figure image of the other subject, and the first focal length corresponding to the figure image of the first subject; and the processing unit of the apparatus is specifically configured to: composite the figure image of the second subject, the obtained figure image, and the selected background image; store composited content and the first focal length to a preset location; and instruct a sending unit to send, to the first device, a completion message for notifying that a group photo has been completed.

The apparatus further includes: the sending unit, configured to send, to the first device according to an instruction of the processing unit, the completion message for notifying that the group photo has been completed.

Specifically, when the apparatus is not an apparatus of the last group photo participant, and the group photo is a group photo of more than two persons, the first media information may include: the figure image of the first subject or the figure image of the first subject and a figure image of another subject, and the first focal length corresponding to the figure image of the first subject; and the processing unit of the apparatus is specifically configured to: composite the figure image of the second subject, the obtained figure image, and the selected background image; and instruct a sending unit to send composited content and the first focal length to a third device.

The apparatus further includes: the sending unit, configured to send the composited content and the first focal length to the third device according to an instruction of the processing unit.

The apparatus further includes: a receiving unit, configured to receive the completion message for notifying that a group picture has been completed.

Specifically, when the apparatus is not an apparatus of the last group photo participant, the first media information includes: the figure image of the first subject or the figure image of the first subject and a figure image of another subject, and the first focal length corresponding to the figure image of the first subject; and the processing unit of the apparatus is configured to: composite the figure image that is of the second subject and from a second device, the obtained figure image, and the selected background image; store composited content and the first focal length to a preset location; and instruct a sending unit to send, to the first device and the second device, a completion message for notifying that a group photo has been completed.

The apparatus further includes: the sending unit, configured to send, to the first device and the second device according to an instruction of the processing unit, the completion message for notifying that a group photo has been completed.

In the foregoing apparatus embodiments, the processing unit may further merge a figure image of a first subject and a figure image of a second subject with an obtained background image of the first subject or an obtained background image of the first subject. In addition, each figure image and/or background image may be obtained from a device that generates each figure image or background ground, or a generation device may store these media files to a preset location, and then a device in need of the media files directly obtains the media files at the preset location.

The present invention further provides a picture processing apparatus. The apparatus includes a processor, a radio frequency module, a memory, a user interface, a transceiver, and the like.

The transceiver obtains data from an external apparatus.

The memory stores code, and the processor controls the code to implement the solutions recorded in the foregoing method embodiments.

It may be clearly understood by persons skilled in the art that, for the purpose of convenient and brief description, for a detailed working process of the foregoing apparatus and units, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is only exemplary. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one location, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are only intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A picture processing method, comprising:
obtaining first media information of a first device, wherein the first media information comprises: a figure image of a first subject and a first focal length corresponding to the figure image;
obtaining a figure image of a second subject by retrieving and applying the first focal length; and
compositing the figure image of the second subject, the figure image of the first subject, and a selected background image.

2. The method according to claim 1, comprising:
obtaining, by a second device, the first media information of the first device, wherein the first media information comprises: the figure image of the first subject or the figure image of the first subject and a figure image of another subject, and the first focal length corresponding to the figure image of the first subject;
obtaining, by the second device, the figure image of the second subject by retrieving and applying the obtained first focal length;
compositing, by the second device, the figure image of the second subject, the obtained figure image, and the selected background image;
storing composited content and the first focal length to a preset location; and
sending, to the first device, a completion message for notifying that a group photo has been completed.

3. The method according to claim 1, comprising:
obtaining, by a second device, the first media information of the first device, wherein the first media information comprises: the figure image of the first subject or the figure image of the first subject and a figure image of another subject, and the first focal length corresponding to the figure image of the first subject;
obtaining, by the second device, the figure image of the second subject by retrieving and applying the obtained first focal length;
compositing, by the second device, the figure image of the second subject, the obtained figure image, and the selected background image;
sending, by the second device, composited content and the first focal length to a third device; and
receiving a completion message for notifying that a group photo has been completed.

4. The method according to claim 1, comprising:
obtaining, by a fourth device, the first media information of the first device, wherein the first media information comprises: the figure image of the first subject or the figure image of the first subject and a figure image of another subject, and the first focal length corresponding to the figure image of the first subject;
obtaining, by the fourth device, the figure image of the second subject by retrieving and applying the first focal length;
compositing, by the fourth device, the figure image of the second subject, the obtained figure image, and the selected background image;
storing composited content and the first focal length to a preset location; and
sending, to the first device and the fourth device, a completion message for notifying that a group photo has been completed.

5. The method according to claim 2, wherein:
obtaining, by a second device, the first media information of the first device comprises:
obtaining, by the second device, the first media information of the first device, wherein the first media information comprises: the figure image of the first subject or the figure image of the first subject and the figure image of the another subject, the first focal length corresponding to the figure image of the first subject, and the background image of the first subject; and
compositing, by the second device, the figure image of the second subject, the obtained figure image, and the selected background image comprises:
compositing, by the second device, the figure image of the second subject, the obtained figure image, and the background image of the first subject.

6. The method according to claim 4, wherein:
obtaining, by the fourth device, the figure image of the second subject by retrieving and applying the first focal length comprises:
obtaining, by the second device and from the first device or at the preset location, the first focal length corresponding to the figure image of the first subject,
obtaining, by the second device, the figure image of the second subject by retrieving and applying the obtained first focal length, and
obtaining, by the fourth device, the obtained figure image of the second subject from the second device; or
obtaining, by the second device and from the first device or at the preset location, the first focal length corresponding to the figure image of the first subject,
obtaining, by the second device by retrieving and applying the obtained first focal length, the figure image of the second subject, and storing the figure image of the second subject to the preset location, and
obtaining, by the fourth device, the figure image of the second subject at the preset location.

7. The method according to claim 4, wherein:
obtaining, by the fourth device, the first media information of the first device comprises:
obtaining, by the fourth device, the first media information of the first device from the first device or at the preset location, wherein the first media information comprises: the figure image of the first subject or the figure image of the first subject and the figure image of the another subject, the first focal length corresponding to the figure image of the first subject, and the background image of the first subject; and
compositing, by the fourth device, the figure image of the second subject, the obtained figure image, and the selected background image comprises:
compositing, by the fourth device, the figure image of the second subject, the obtained figure image, and the background image of the first subject.

8. A picture processing apparatus, comprising a computer processor configured to:
obtain first media information of a first device, wherein the first media information comprises: a figure image of a first subject and a first focal length corresponding to the figure image;

obtain a figure image of a second subject by retrieving and applying the first focal length; and composite the figure image of the second subject, the figure image of the first subject, and a selected background image.

9. The apparatus according to claim 8, wherein the computer processor is configured to:

obtain the first media information of the first device, wherein the first media information comprises: the figure image of the first subject or the figure image of the first subject and a figure image of another subject, and the first focal length corresponding to the figure image of the first subject;

obtain the figure image of the second subject by retrieving and applying the obtained first focal length;

composite the figure image of the second subject, the obtained figure image, and the selected background image;

store composited content and the first focal length to a preset location; and instruct a transmitter to send, to the first device, a completion message for notifying that a group photo has been completed, wherein the transmitter is configured to send, to the first device according to an instruction of the computer processor, the completion message for notifying that a group photo has been completed.

10. The apparatus according to claim 8, wherein:

the computer processor is configured to:

obtain the first media information of the first device, wherein the first media information comprises: the figure image of the first subject or the figure image of the first subject and a figure image of another subject, and the first focal length corresponding to the figure image of the first subject;

obtain the figure image of the second subject by retrieving and applying the obtained first focal length;

composite the figure image of the second subject, the obtained figure image, and the selected background image; and instruct a transmitter to send composited content and the first focal length to a third device, wherein the transmitter is configured to send the composited content and the first focal length to the third device according to an instruction of the computer processor; and the apparatus further comprises a receiver configured to receive a completion message for notifying that a group photo has been completed.

11. The apparatus according to claim 8, wherein the computer processor is configured to:

obtain the first media information of the first device, wherein the first media information comprises: the figure image of the first subject or the figure image of the first subject and a figure image of another subject, and the first focal length corresponding to the figure image of the first subject;

obtain the figure image of the second subject by retrieving and applying the first focal length;

composite the figure image of the second subject, the obtained figure image, and the selected background image;

store composited content and the first focal length to a preset location; and instruct a transmitter to send, to the first device and a second device, a completion message for notifying that a group photo has been completed, wherein the transmitter is configured to send, to the first device and the second device according to an instruction of the computer processor, the completion message for notifying that a group photo has been completed.

12. The apparatus according to claim 9, wherein the computer processor is configured to:

obtain the first media information of the first device, wherein the first media information comprises: the figure image of the first subject or the figure image of the first subject and the figure image of the another subject, the first focal length corresponding to the figure image of the first subject, and the background image of the first subject; and composite the figure image of the second subject, the obtained figure image, and the background image of the first subject.

13. The apparatus according to claim 11, wherein the computer processor is configured to:

obtain the determined figure image of the second subject from the second device, wherein the figure image of the second subject is determined by the second device by retrieving and applying the first focal length that is corresponding to the figure image of the first subject and obtained by the second device; or obtain the figure image of the second subject at the preset location and store the figure image of the second subject to the preset location, wherein the figure image of the second subject is obtained by the second device by retrieving and applying the first focal length that is corresponding to the figure image of the first subject and that is obtained by the second device.

14. The apparatus according to claim 11, wherein the computer processor is configured to:

obtain the first media information of the first device from the first device or at the preset location, wherein the first media information comprises: one of the figure image of the first subject or the figure image of the first subject and the figure image of the another subject, the first focal length corresponding to the figure image of the first subject, and the background image of the first subject; and composite the figure image of the second subject, the obtained figure image, and the background image of the first subject.

15. A non-transitory computer-readable storage medium comprising instructions which, when executed by a computer, cause the computer to:

obtain first media information of a first device, wherein the first media information comprises: a figure image of a first subject and a first focal length corresponding to the figure image;

obtain a figure image of a second subject by retrieving and applying the first focal length; and composite the figure image of the second subject, the figure image of the first subject, and a selected background image.

* * * * *